United States Patent
Lee et al.

(10) Patent No.: US 6,820,231 B2
(45) Date of Patent: Nov. 16, 2004

(54) COMMUNICATION SYSTEM, AND METHOD OF TRANSMITTING DATA THEREIN

(75) Inventors: Young Jo Lee, Seoul (KR); Young Cho Kim, Seoul (KR)

(73) Assignee: LG Electronics Inc., Seoul (KR)

(*) Notice: Subject to any disclaimer, the term of this patent is extended or adjusted under 35 U.S.C. 154(b) by 534 days.

(21) Appl. No.: 09/866,592

(22) Filed: May 30, 2001

(65) Prior Publication Data

US 2001/0050900 A1 Dec. 13, 2001

(30) Foreign Application Priority Data

Jun. 2, 2000 (KR) .......................................... 2000-30366

(51) Int. Cl.$^7$ .............................................. H03M 13/00
(52) U.S. Cl. ...................................... 714/781; 714/759
(58) Field of Search ................................ 370/333, 235; 455/67.1, 422; 375/225; 714/781, 712, 717, 759

(56) References Cited

U.S. PATENT DOCUMENTS

| | | | | |
|---|---|---|---|---|
| 5,825,761 A | * | 10/1998 | Tanaka et al. | 370/333 |
| 5,857,147 A | * | 1/1999 | Gardner et al. | 455/67.1 |
| 5,872,775 A | | 2/1999 | Saints et al. | 370/252 |
| 6,163,571 A | * | 12/2000 | Asokan et al. | 375/225 |
| 6,298,042 B1 | * | 10/2001 | Murase et al. | 370/235 |
| 6,542,736 B1 | * | 4/2003 | Parkvall et al. | 455/422 |

* cited by examiner

Primary Examiner—David Ton
(74) Attorney, Agent, or Firm—Fleshner & Kim, LLP (57) ABSTRACT

Disclosed is a method of transmitting data in a communication system. A receiving part determines an optimum data transmission rate in accordance with the change of the channel environment of the receiving part, and provides the determined data transmission rate to a transmitting part. The transmitting part processes the data to be transmitted according to the transmitted optimum data transmission rate, and transmits the processed data to the receiving part. The transmitting part applies a different data coding rate or modulation type to the data to be transmitted in accordance with the determined data transmission rate. Since the optimum data transmission rate is determined in accordance with the change of the channel environment of the receiving part, an improved data throughput and re-transmission probability can be obtained with a reduced delay. Also, the insufficiency of memory capacity in the receiving part can be solved.

30 Claims, 11 Drawing Sheets

| Data transmission rate | SIR |
|---|---|
| 960kbps | 14 |
| | 13 |
| | 12 |
| | 11 |
| 480kbps | 10 |
| | 9 |
| | 8 |
| | 7 |
| 240kbps | 6 |
| | 5 |
| | 4 |
| | 3 |

SIR range

| Data transmission rate | SIR |
|---|---|
| 960kbps | 14 |
|  | 13 |
|  | 12 |
|  | 11 |
| 480kbps | 10 |
|  | 9 |
|  | 8 ←|
|  | 7 |
| 240kbps | 6 |
|  | 5 |
|  | 4 |
|  | 3 |

| Data transmission rate | SIR |
|---|---|
| 960kbps | 16 |
| | 15 |
| | 14 |
| | 13 |
| 480kbps | 12  |
| | 11 |
| | 10 |
| | 9 |
| 240kbps | 8 |
| | 7 |
| | 6 |
| | 5 |

FIG. 6

COMMUNICATION SYSTEM, AND METHOD OF TRANSMITTING DATA THEREIN

BACKGROUND OF THE INVENTION

1. Field of the Invention

The present invention relates to communication system, and a method of transmitting data therein.

2. Description of the Related Art

Generally, a communication system has a channel wherein the communication environment is instantaneously changed in accordance with the position or moving speed of a user, and this change of the channel environment causes the whole communication environment to greatly deteriorate.

At present, the Internet is on an explosively increasing trend throughout the world. Accordingly, the standard of a radio data communication service for providing a data communication service to radio communication users is preparing. That is, the standard for an IMT-2000 system is now preparing as a new mobile communication system.

Meanwhile, the current radio communication environment is very deteriorated, and such deterioration limits the data transmission speed. Various kinds of methods have been used to overcome the deterioration of the environment and to provide a good quality of call required by the users.

One among the above methods is a method of adjusting a data rate. According to this data rate adjustment method, the data modulation type is selectively changed in a manner that a high-speed data transmission such as a quadrature amplitude modulation (QAM) is used in case that the communication environment is good, while a phase shift keying (PSK), which has a strong endurance against the interference noise, but has a low transmission speed, is used in case of an inferior communication environment.

Another is a method of effectively using limited radio channels by changing a coding rate in accordance with the communication environment. This coding rate changing method reduces an error rate by giving redundancy to information data.

According to the coding rate changing method, the coding rate is reduced by increasing the redundancy of data in case of the communication environment greatly deteriorated. By using this coding method, the data transmission speed is reduced. On the contrary, in case of a good communication environment, the coding rate is increased by reducing the redundancy of data. By using this coding method, the data transmission speed is increased.

According to the conventional data transmission methods for the communication system, the data transmission rate of a communication service is determined only by an amount of data to be transmitted without analyzing the channel environment of the user.

Accordingly, the call quality deteriorates in performing the communication service, and even a transmission delay is produced when the data having an error is retransmitted. As a result, a great loss is produced in the communication service.

Meanwhile, it is checked for each data frame by a cyclic redundancy check code whether an error is occurred in the data that is transmitted from a transmitting part to a receiving part through the radio communication environment.

This error checking method using the cyclic redundancy check code (CRC) detects a bit error with respect to all bits in one frame.

According to this method, the transmitting part considers the whole frame as a first number, and carries on a frame check sequence (FCS) of the transmitted data a remainder obtained by dividing the first number by a second number (for example, 100100000100010011) of a prearranged pattern with the receiving part.

The receiving part divides the number corresponding to the received frame by the second number having the same pattern, and compares the remainder thereof with the received frame check sequence (FCS). The bit error occurred within the received frame is detected in accordance with the result of comparison.

The error check method using the cyclic redundancy check code improves the reliability of bit error detection by increasing the sequence of bit pattern in case that the state of the communication environment is inferior.

Meanwhile, if an error is occurred, the receiving part can request to the transmitting part re-transmission of the frame in which the error is occurred.

In order to reduce the error rate of the frame subject to re-transmission, the receiving part soft-combines the re-transmitted data with the stored data that was firstly transmitted. This improves the error rate of the data transmitted to the receiving part.

However, a memory is essentially required to use the soft combining method. If an error is occurred again in the retransmitted data, an additional memory capacity is required. In performing the re-transmission of the data, a data transmission delay is also produced.

SUMMARY OF THE INVENTION

Therefore, an object of the invention is to solve the problems involved in the related art, and to provide communication system and a method of transmitting data therein that can improve the transmission efficiency by determining the data transmission rate in accordance with the channel state of a receiving part.

It is another object of the present invention to provide communication system and a method of transmitting data therein that can improve the receiving probability of data re-transmitted from a transmitting part when a receiving part requests the data re-transmission.

It is still another object of the present invention to provide communication system and a method of transmitting data therein that can reduce the required capacity of memory by preventing an error from repeatedly occurring in the transmitted data.

In one aspect of the present invention, a receiving part measures a receiving quality of a signal received from a transmitting part, and determines the data transmission rate to be used in a transmitting part by the measured receiving quality. The transmitting part differently applies a data coding rate or modulation type of data to be transmitted in accordance with the determined data transmission rate, and transmits the data to the receiving part.

Preferably, the data transmission rate may be determined as the data transmission rate mapped on the receiving quality measured from a mapping table prepared by a fixed type algorithm having a receiving quality range that is fixed in accordance with the data transmission rate of the received signal.

Preferably, the data transmission rate may be determined as the data transmission rate mapped on the receiving quality measured from a mapping table prepared by a variable type algorithm having a receiving quality range that varies in accordance with the data transmission rate of the received signal.

In the mapping table according to the fixed type algorithm, the receiving quality range that belongs to a certain data transmission rate is divided into predetermined steps. Accordingly, if a frame(or CRC) error is occurred in the received signal in the receiving part, the step corresponding to the measured receiving quality is heightened by one step. Meanwhile, if a frame(or CRC) error is not occurred in the received data in the receiving part, the step corresponding to the measured receiving quality is lowered by one step. Then, a data transmission rate on the mapping table that corresponds to the heightened or lowered receiving quality is provided to the transmitting part as a determined data transmission rate.

It is assumed that in the variable type algorithm, the heightened interval of the receiving quality is defined as "Δ", and the lowered interval of the receiving quality is defined as "Γ". If a frame(or CRC) error is occurred in the received data in the receiving part, the mapping table is changed in a manner that the receiving quality range is lowered by Γ". Meanwhile, if a frame(or CRC) error is not occurred in the received data in the receiving part, the mapping table is changed in a manner that the receiving quality range is heightened by "Δ". Then, a data transmission rate that is mapped on the newly measured receiving quality range is provided from the changed mapping table to the transmitting part.

Preferably, in order to measure the receiving quality, one among a pilot signal level, signal to interference ratio, bit error rate, and frame error rate of data received in the receiving part may be used.

Preferably, if the received data in the receiving part is error, the transmitting part may assign more power to the data, and re-transmit the resultant data to the receiving part. Also, the transmitting part may re-transmit the data with the data transmission rate determined by the fixed type or variable type algorithm.

BRIEF DESCRIPTION OF THE DRAWINGS

The above objects, and other features and advantages of the present invention will become more apparent after a reading of the following detailed description when taken in conjunction with the drawings, in which.

DETAILED DESCRIPTION OF THE PREFERRED EMBODIMENTS

Hereinafter, a method of transmitting data in a communication system according to the present invention will be described with respect to preferred embodiments illustrated in the annexed drawings.

In the embodiments of the present invention, the receiving part measures the receiving quality of the data transmitted from the transmitting part, and determines an optimum data transmission rate according to the receiving quality. Thereafter, the receiving part provides the determined data transmission rate to the transmitting part. This algorithm is called an adaptive algorithm for the data transmission rate.

Here, the receiving quality of pilot signal can be obtained using various parameters such as a level of a received pilot signal, signal to interference rate (SIR), bit error rate (BER), frame error rate (FER), etc.

According to the present invention, when the frame error is detected, the receiving part can request the re-transmission of the data. In this case, an algorithm for improving the receiving probability of the data in the receiving part is proposed.

Now, the construction and effect of the preferred embodiments of the present invention will be explained with reference to the accompanying drawings.

Figure 1:
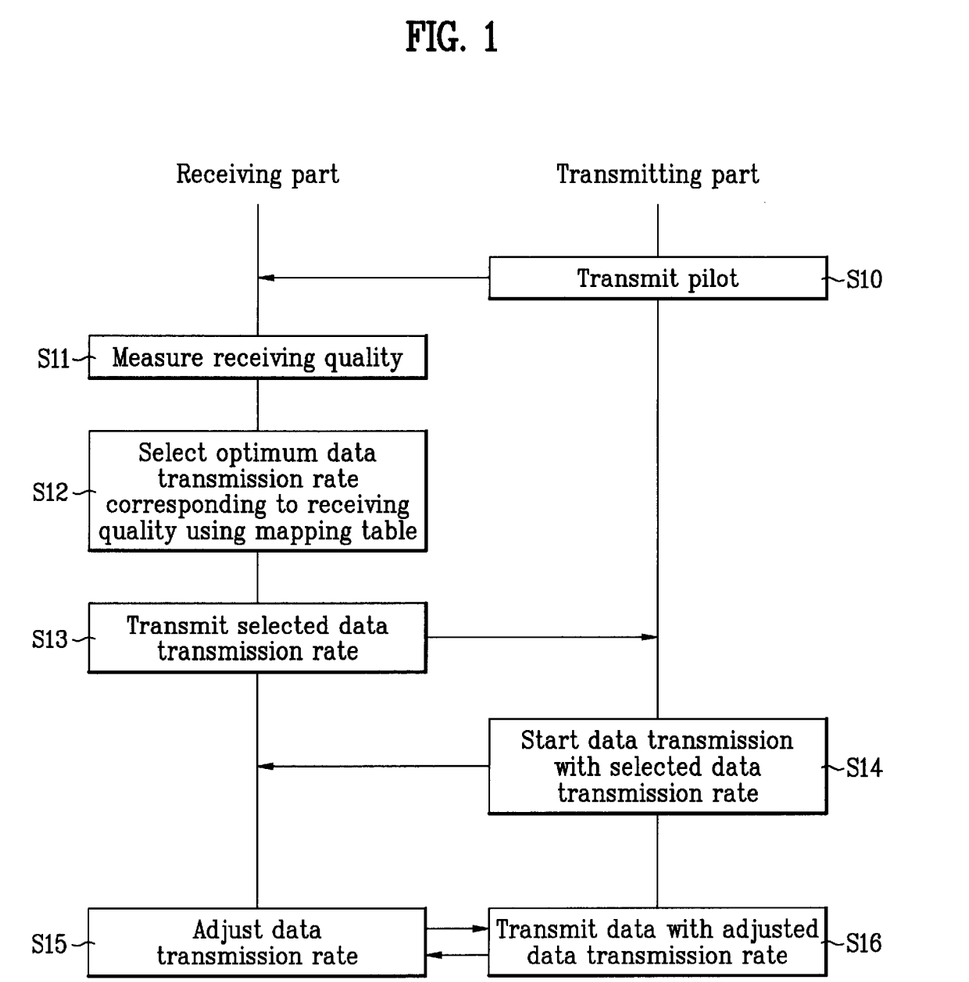
FIG. 1 is a diagram illustrating a data transmitting method using an adaptive algorithm for a data transmission rate according to the present invention.

FIG. 1 is a diagram illustrating the data transmitting method using an adaptive algorithm for a data transmission rate according to the present invention.

Referring to FIG. 1, the receiving part measures the receiving channel environment, i.e., receiving quality of the receiving part, using the pilot signal (step S10) transmitted from the transmitting part (step S11). The receiving quality is obtained using the parameters such as a level of a received pilot signal power, signal to interference rate (SIR), bit error rate (BER), frame error rate (FER), etc.

Using the measured receiving quality, the receiving part determines the transmission rate of the data through a predetermined mapping table (step S12). For example, in case that the SIR is used as the parameter of the receiving quality, the mapping table is composed of optimum SIR ranges according to the data transmission rate.

The receiving part transmits the optimum data transmission rate as determined above to the transmitting part (step S13).

The transmitting part applies the modulation type or coding rate that corresponds to the data transmission rate requested by the receiving part to the data, and transmits the data to the receiving part (step S14).

The receiving part receives the data corresponding to modified modulation type or coding rate, and decides whether the transmitted data is error or not again, and readjust the data transmission rate (step S15).

Then, the receiving part transmits the readjusted data transmission rate to the transmitting part again. The transmitting part changes again the modulation type or coding rate according to the readjusted data transmission rate, and transmits the data to the receiving part accordingly (step S16).

Generally, since the environment of the communication system is a variable environment, and the topographical condition is changed according to the user's position, the redefined mapping table cannot become the best one. Accordingly, an error always exists between the measured value of the receiving quality of the currently received data and the mapping table, and this results in performance deterioration of the communication system.

Hereinafter, the process of improving the performance of the system using the adaptive algorithm for the data transmission rate will be explained in detail.

In case that the SIR is used as the parameter of the receiving quality, a fixed type algorithm having the SIR of a fixed range with respect to the data transmission rate may be used as the adaptive algorithm for the data transmission rate.

Meanwhile, a variable type algorithm having the SIR range that varies with respect to a certain data transmission rate.

Figure 2A:
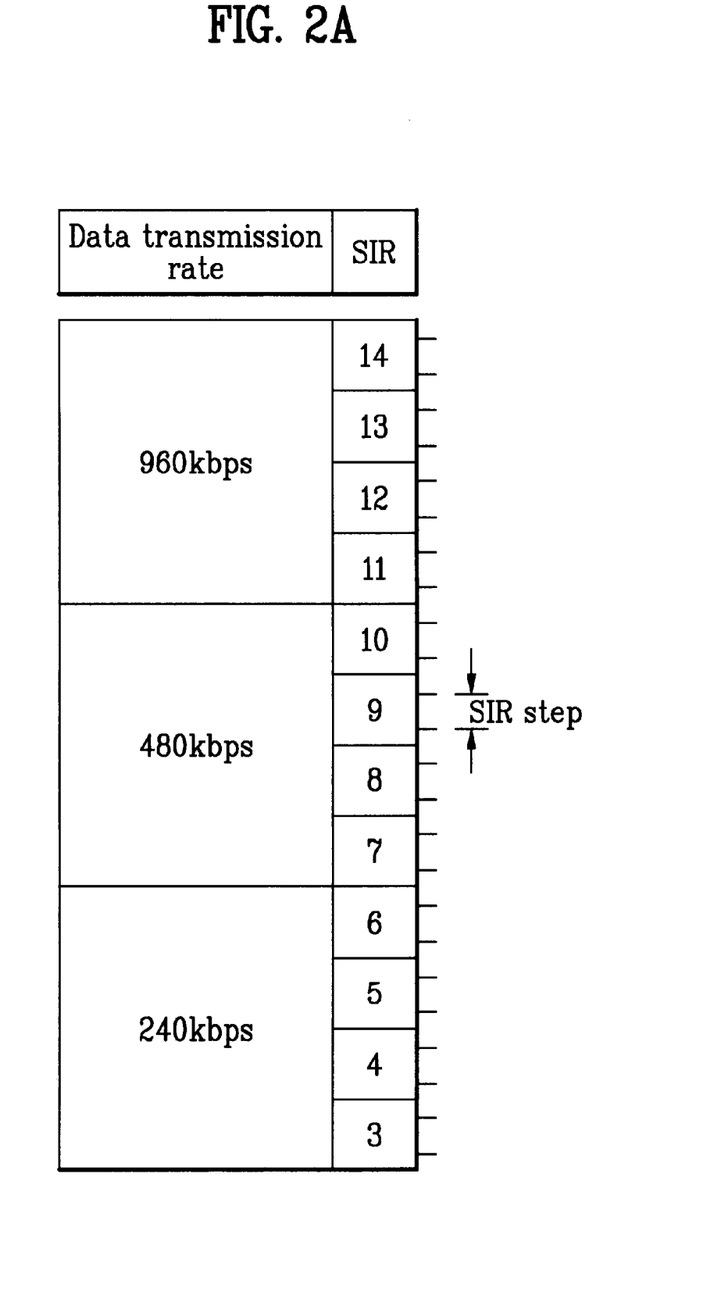
FIG. 2a is a diagram illustrating an example of a mapping table using a fixed type algorithm that is a kind of the adaptive algorithm for the data transmission rate.

As shown in FIG. 2a, a mapping table, which is composed of data transmission rates and SIRs of the received data having a fixed range with respect to the data transmission rates, is prepared by the fixed type algorithm.

Meanwhile, if no frame (or CRC) error is occurred as a result of checking existence/nonexistence of the error of the data frame received in the receiving part using the CRC code, the SIR step mapped on the data transmission rate based on the mapping table of FIG. 2a is heightened, and the data transmission from the transmitting part to the receiving part is performed with the data transmission rate higher than the present transmission rate.

On the contrary, if an error is occurred as a result of checking existence/nonexistence of the error of the data frame received in the receiving part using the CRC code, the SIR step mapped on the data transmission rate based on the mapping table of FIG. 2a is lowered, and the data transmission from the transmitting part to the receiving part is performed with the data transmission rate lower than the present transmission rate.

The range of the SIR with respect to a certain data transmission rate is divided into predetermined steps.

Figure 3A:
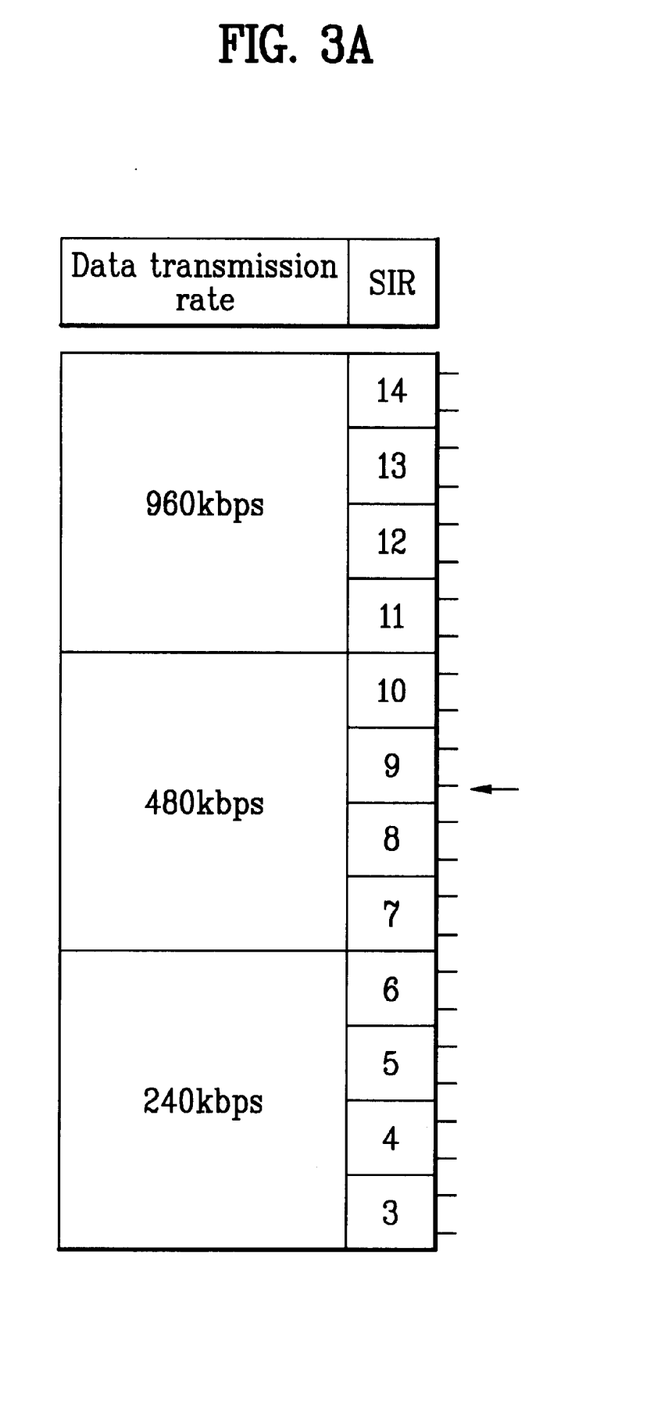
FIGS. 3a, 3b, and 3c are diagrams illustrating examples of data transmission rate determination on a mapping table prepared using the fixed type algorithm in accordance with existence/nonexistence of the frame(or CRC) error of the data received in the receiving part.

For example, in case that the SIR of the receiving part is 9 dB as shown in FIG. 3a, the data transmission rate from the transmitting part is 480 Kbps. Here, if no error is occurred as a result of checking existence/nonexistence of the error of the data frame received in the receiving part using the CRC code, the SIR step is heightened by one step as shown in FIG. 3b.

Figure 3B:
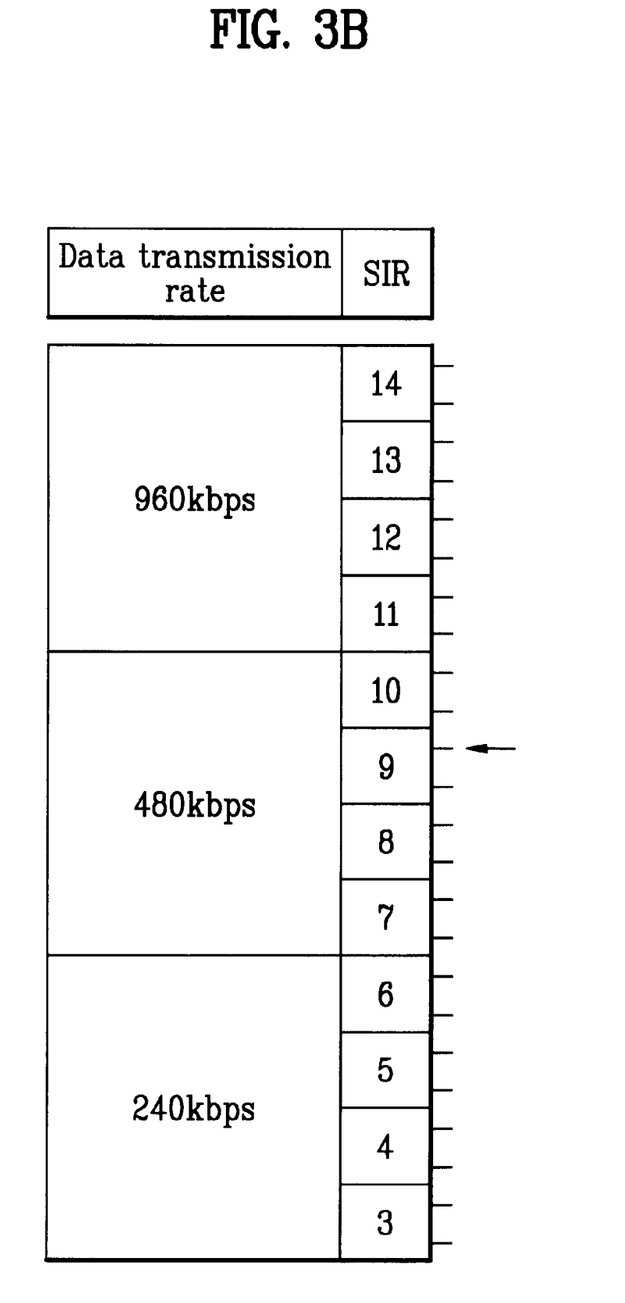

However, as shown in FIG. 3b, since the data transmission rate is still 480 Kbps at the heightened step, the data transmission rate is not changed.

On the contrary, if an error is occurred as a result of checking existence/nonexistence of the error of the data frame received in the receiving part using the CRC code, the SIR is lowered by one step.

Figure 3C:
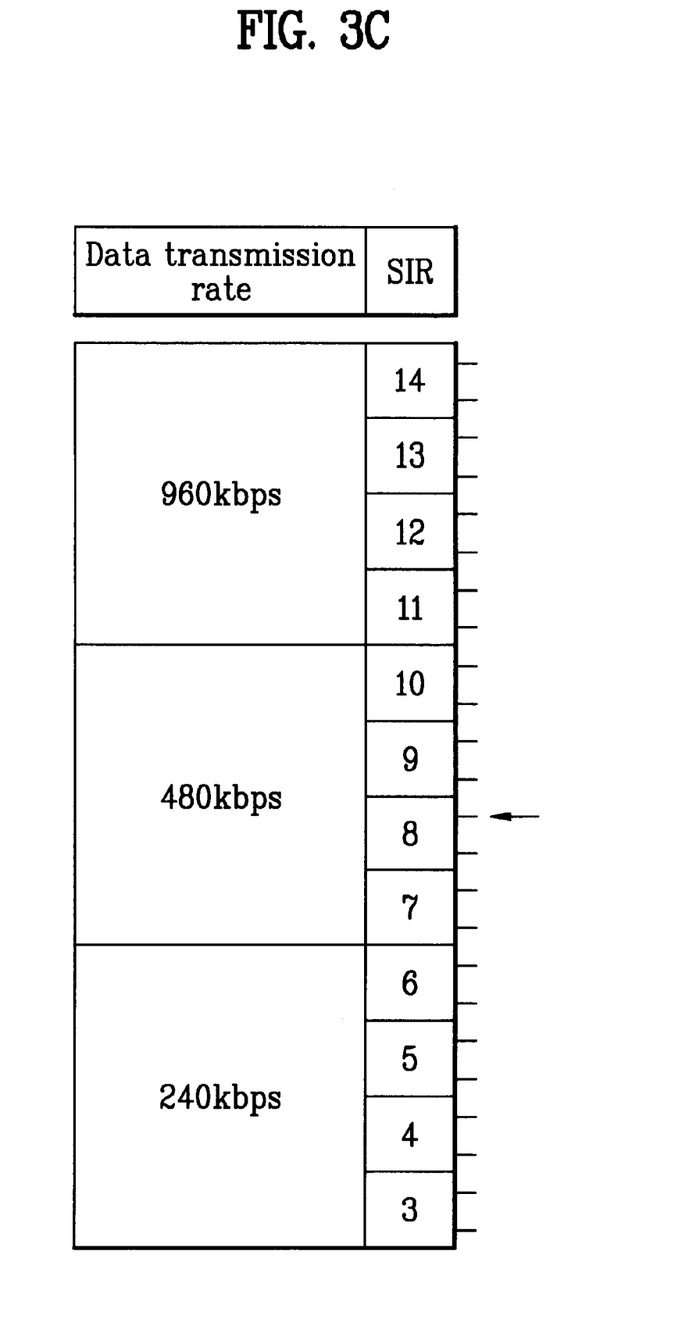

At this time, as shown in FIG. 3c, since the data transmission rate is still in the range of 480 Kbps at the lowered step, the data transmission rate is not changed.

As another example, if the SIR of the receiving part is 6 dB, and no error is occurred as a result of checking existence/nonexistence of the error of the data received in the receiving part, the SIR step is heightened by one step. In this case, as shown in FIG. 3c, the data, which was previously transmitted with the data transmission rate of 240 Kbps, is now transmitted with the data transmission rate of 480 Kbps.

Meanwhile, if the SIR of the receiving part is 7 dB, and an error is occurred as a result of checking existence/nonexistence of the error of the data received in the receiving part, the SIR step is lowered by one step. In this case, the data, which was previously transmitted with the data transmission rate of 480 Kbps, is now transmitted with the data transmission rate of 240 Kbps.

As described above, the fixed type algorithm changes the transmission rate of the data transmitted from the transmitting part to the receiving part in accordance with the change of the channel environment of the receiving part. Thus, the receiving probability of the data transmitted to the receiving part is improved.

Figure 4:
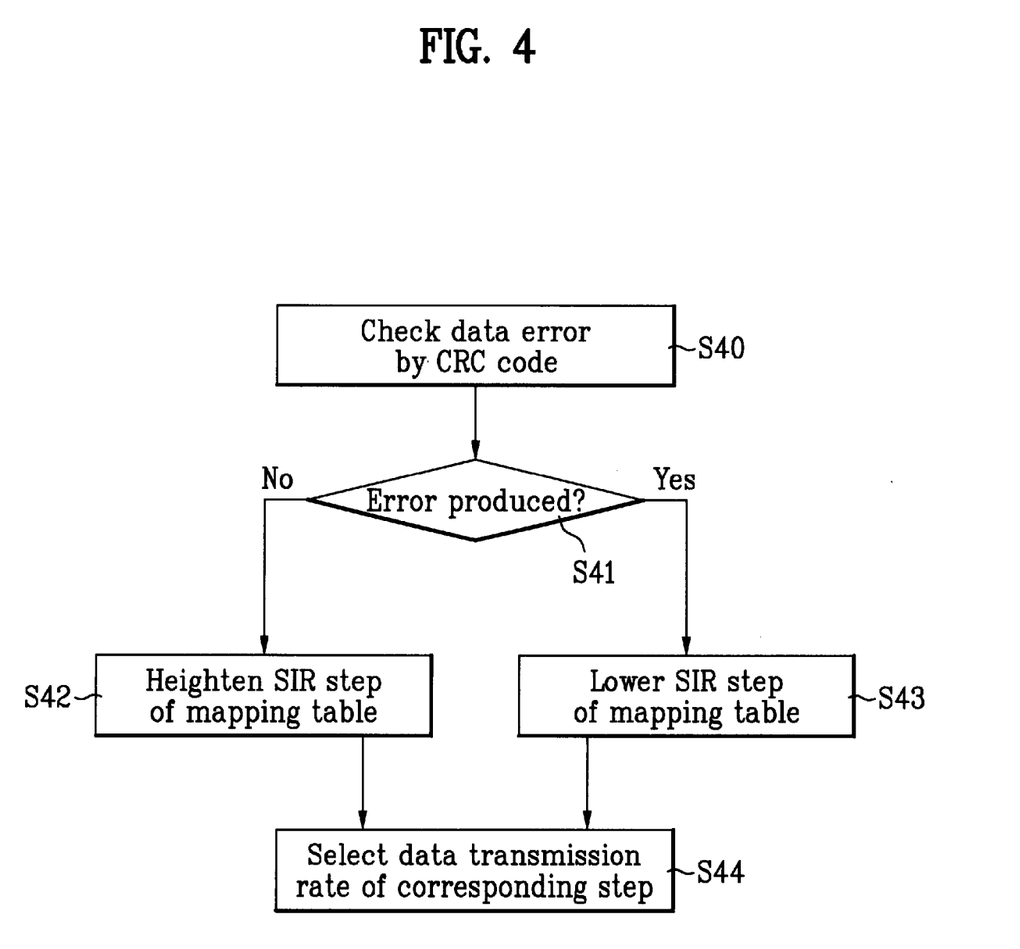
FIG. 4 is a flowchart illustrating the fixed type algorithm that is a kind of the adaptive algorithm for the data transmission rate.

FIG. 4 is a flowchart illustrating the fixed type algorithm that is a kind of the adaptive algorithm for the data transmission rate.

Referring to FIG. 4, if an error is occurred (step S41) as a result of checking the existence/nonexistence of the error of the data received in the receiving part (step S40) using the CRC code, the SIR step according to the data transmission rate on the mapping table is lowered by one step (step S43).

On the contrary, if no error is occurred (step S41), the SIR step according to a certain data transmission rate is heightened by one step (step S42).

In accordance with the data transmission rate (step S44) corresponding to (or mapped on) heightened or lowered SIR step on the mapping table, the transmitting part differently applies the coding rate or modulation type of the data to be transmitted.

Hereinafter, the variable type algorithm will be explained.

It is assumed that the mapping table according to the fixed type algorithm as described above has been prepared.

The data transmission rate and the SIR range corresponding to the data transmission rate are heightened or lowered by measurement of the error using the CRC code. The mapping table prepared by the fixed type algorithm is changed according to the SIR range. Accordingly, this mapping table is called the variable type algorithm.

Figure 2B:
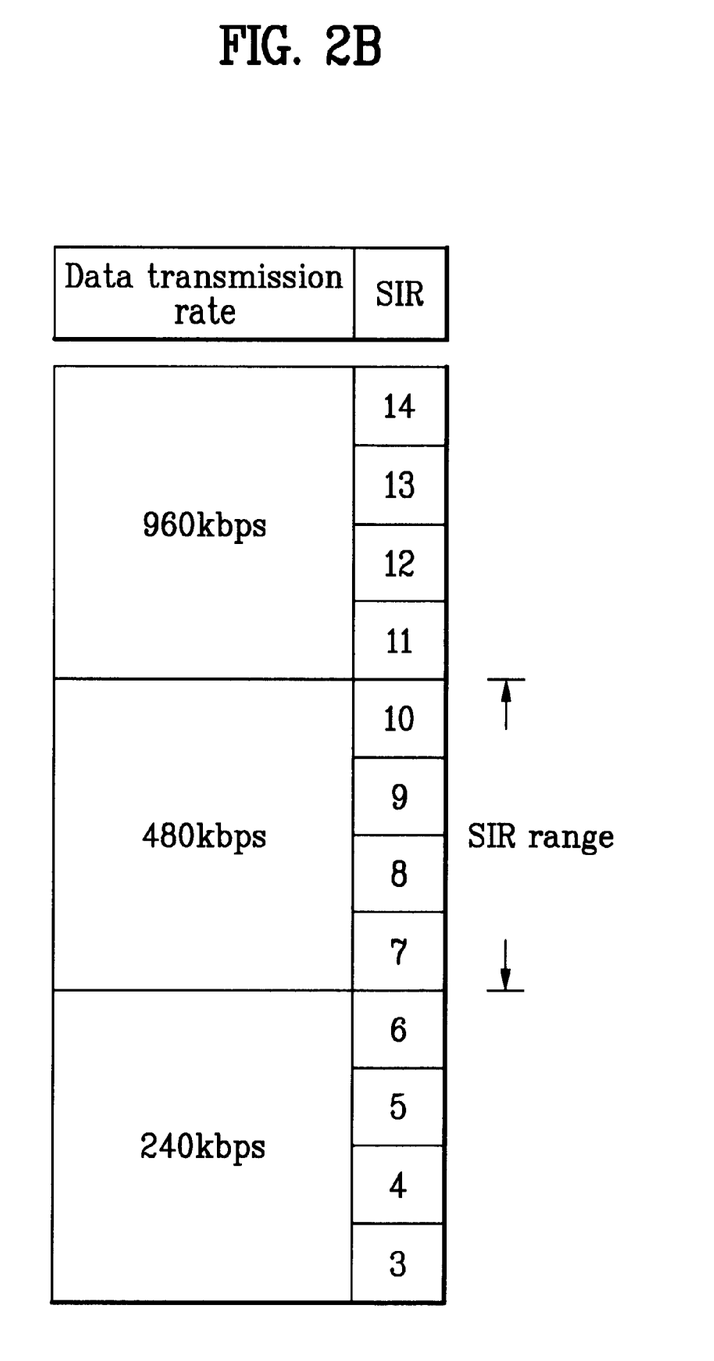
FIG. 2b is a diagram illustrating an example of a mapping table using a variable type algorithm that is a kind of the adaptive algorithm for the data transmission rate.

First, it is assumed that the mapping table as shown in FIG. 2b has been prepared.

According to this variable type algorithm, the first SIR range mapped on a certain data transmission rate may be changed through the error check using the CRC code.

Specifically, the existence/nonexistence of the error of the data received in the receiving part is once checked using the CRC code. If an error is occurred in the data as a result of checking, the SIR range is heightened by $\Delta SIR_{up}$.

On the contrary, if no error is occurred in the data as a result of once checking the existence/nonexistence of the error of the data received in the receiving part using the CRC code, the SIR range is lowered by $\Delta SIR_{down}$.

Figure 5A:
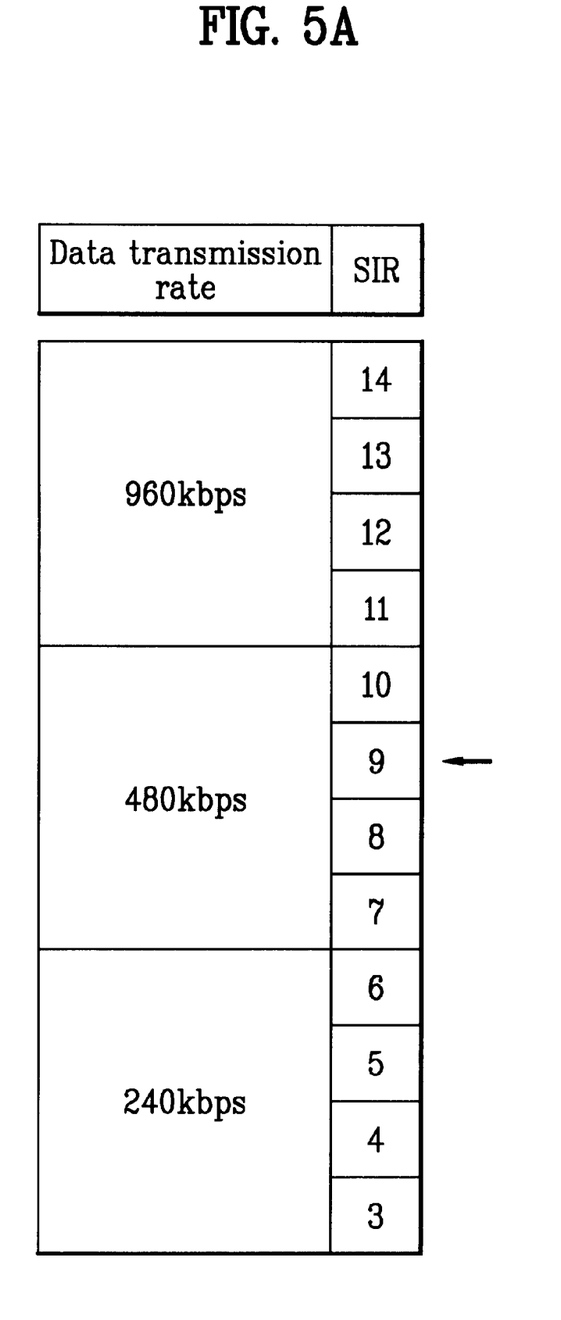
FIGS. 5a, 5b and 5c are diagrams illustrating examples of data transmission rate determination on a mapping table prepared using the variable type algorithm in accordance with existence/nonexistence of the frame(or CRC) error of the data received in the receiving part.

It is assumed that $\Delta SIR_{up}$=0.5 dB, $\Delta SIR_{down}$=0.1 dB, and the SIR of the received data is 9 dB as shown in FIG. 5a. In this case, the data transmission rate of the data transmitted from the transmitting part is 480 Kbps.

Here, if no error is occurred as a result of consecutive ten times error checking using the CRC code, the SIR in the mapping table is lowered by "0.1*10=1 dB."

Figure 5B:
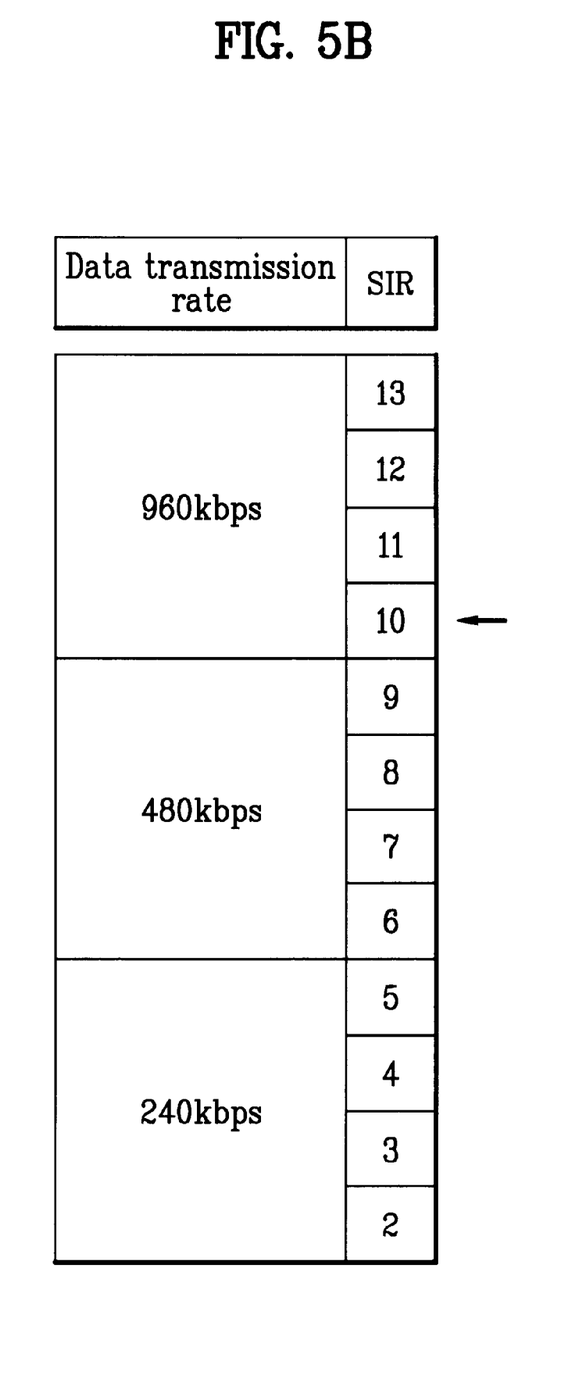

As shown in FIG. 5b, the mapping table is changed to the mapping table according to the variable type algorithm in a manner that the SIR range corresponding to 240 Kbps is changed to 2~5 dB, the SIR range corresponding to 480 Kbps 6~9 dB, and the SIR range corresponding to 960 Kbps 10~13 dB, respectively.

At this time, if the SIR of the received signal is measured again to be 10 dB, the optimum data transmission rate selected through the variable mapping table becomes 960 Kbps. For reference, the data transmission rate mapped on the newly measured SIR in the mapping table according to the fixed algorithm, which is prior to the variable mapping table, is 480 Kbps.

On the contrary, as shown in FIG. 5a, if the error check is performed four times using the CRC code, and 4 consecutive errors are occurred on the data received in the receiving part, the SIR range in the variable mapping table is heightened as much as "4*0.5=2 dB."

Figure 5C:
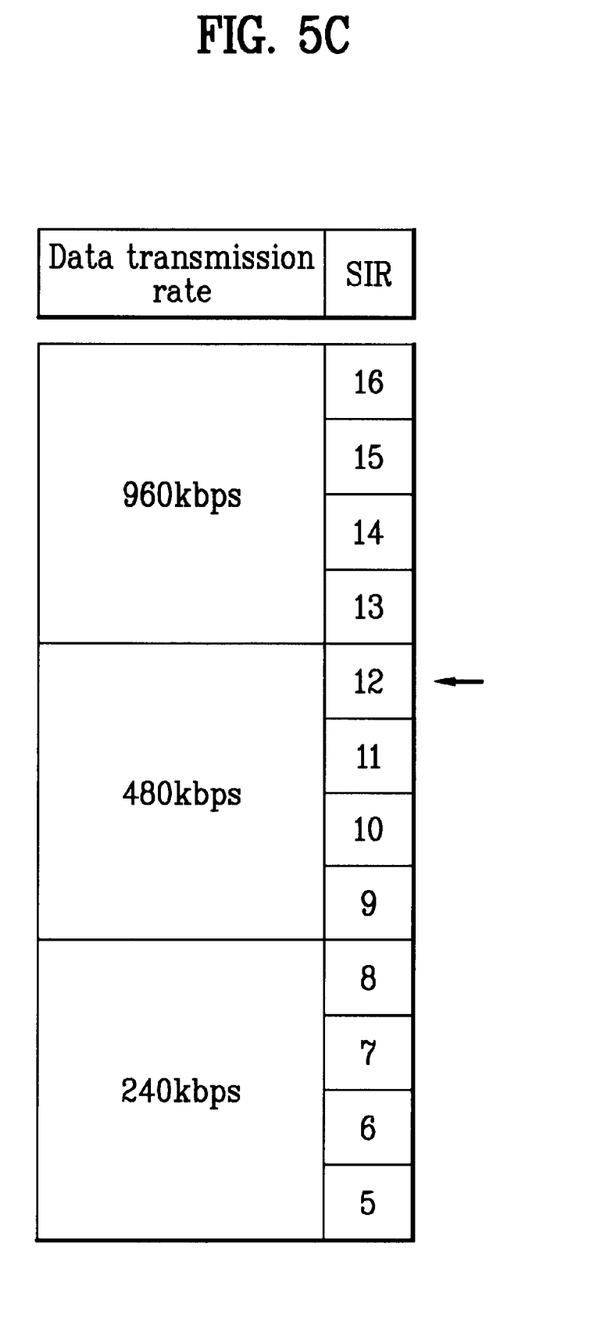

Thus, as shown in FIG. 5c, the mapping table is changed to the mapping table according to the variable type algorithm in a manner that the SIR range corresponding to 240 Kbps is changed to 5~8 dB, the SIR range corresponding to 480 Kbps 9~12 dB, and the SIR range corresponding to 960 Kbps 13~16 dB, respectively.

In case of using such a variable mapping table, the data transmission rate becomes 480 Kbps even though the estimated SIR is 10 dB.

Figure 6:
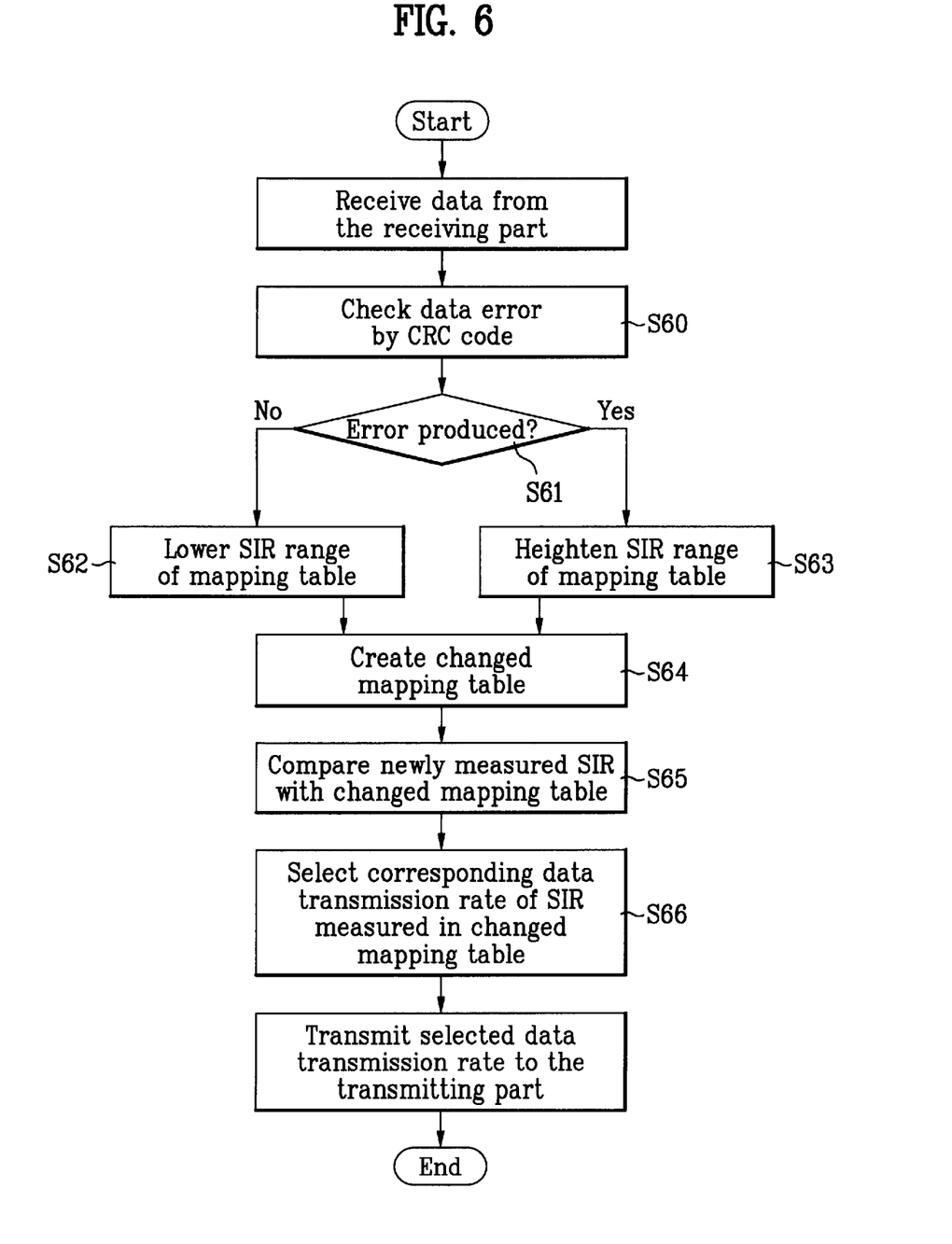
FIG. 6 is a flowchart illustrating the variable type algorithm that is a kind of the adaptive algorithm for the data transmission rate.

FIG. 6 is a flowchart illustrating the variable type algorithm that is a kind of the adaptive algorithm for the data transmission rate.

Referring to FIG. 6, if an error is occurred as a result of checking the existence/nonexistence of the error of the data received in the receiving part (step S60) using the CRC code, the SIR range according to the data transmission rate on the mapping table is lowered as much as "the number of error occurrence * $\Delta SIR_{down}$" (step S63).

On the contrary, if no error is occurred, the SIR range according to a certain data transmission rate is lowered by "$\Delta SIR_{up}$" (step S62).

Accordingly, the initial mapping table of the variable algorithm, i.e., the mapping table, is changed to a changed mapping table that includes the heightened or lowered receiving quality range (step S64).

Then, the newly measured SIR is compared with the data transmission rate on the changed mapping table (step S65).

As a result of comparison, the data transmission rate corresponding to the newly measured SIR is determined on the changed mapping table (step S66).

Meanwhile, the existence/nonexistence of the error of the data received in the receiving part is checked using the CRC code. If an error is occurred, the receiving part can request the re-transmission of the data to the transmitting part.

In this case, the transmitting part re-transmits the data where the error is occurred.

At this time, it is preferable to heighten the receiving probability of the data re-transmitted from the transmitting part. For this, two methods may be used as follows.

The first method is to transmit the data with the power of the transmitted data heightened additionally.

The second method is to transmit the data with the transmission rate of the transmitted data lowered.

The first data transmitting method assigns the additional power to the re-transmitted data. This power control method directly heightens the receiving quality and increases the transmission probability by assigning more transmission power to the re-transmitted data.

The second data transmitting method lowers the transmission rate of the data transmitted from the transmitting part.

This second method increases the receiving probability of the data in the receiving part by changing the transmission rate of the data transmitted from the transmitting part using the fixed type or variable type algorithm as described above.

Accordingly, the data is transmitted from the transmitting part by additionally assigning the power as much as $\Delta dB$ with respect to the transmitted data, or the data is re-transmitted with the transmission rate or less than the transmitted data.

The above description exemplifies the case that the mapping table is prepared in the receiving part. On the contrary, the mapping table may be prepared in the transmitting part. In this case, the receiving part transmits the receiving quality information to the transmitting part.

Meanwhile, the transmitting part can change the mapping table according to the receiving quality information, and determine a new data transmission rate on the changed mapping table.

For example, a mapping table having a range of receiving quality for the data transmission rate is prepared in the transmitting part using the fixed or variable type algorithm. The receiving part measures the receiving quality of the pilot signal, and transmits the information corresponding to the measured receiving quality to the transmitting part. The transmitting part determines the data transmission rate using the information corresponding to the measured receiving quality and the mapping table. Thereafter, the transmitting part encodes the data to be transmitted according to the determined data transmission rate, and then transmits the processed data to the receiving part.

Other processes are the same as those of the case that the mapping table is prepared in the receiving part, and the detailed explanation thereof will be omitted.

As described above, the present invention has the following advantages.

First, since the receiving quality is measured by the receiving part, and an optimum data transmission rate is determined accordingly, the probability of error occurrence is reduced, and an actual data throughput is increased.

Second, when a serious error is occurred in the data received in the receiving part, the receiving part can request re-transmission of the data to the transmitting part. At this time, the present invention relatively heightens the receiving probability. Accordingly, the data throughput is increased, a delay caused by the re-transmission is reduced, and the insufficiency of the memory capacity for storing the data where the error is occurred is solved.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A method of transmitting data in a communication system comprising the steps of:

a receiving part measuring a receiving quality of a received pilot signal, and determining the data transmission rate in accordance with the measured receiving quality;

the receiving part transmitting the determined data transmission rate to a transmitting part;

the transmitting part encoding data to be transmitted in accordance with the determined data transmission rate, and transmitting the encoded data to the receiving part;

the receiving part determining whether an error occurs in the data received from the transmitting part; and adjusting to a new value associated with a mapping table based on the determination of whether the error occurs.

2. The method as claimed in claim 1, wherein the data to be transmitted from the transmitting part is processed by a coding rate and modulation type that correspond to the determined data transmission rate.

3. The method as claimed in claim 1, wherein the receiving quality is measured using one among a pilot signal power level included in the signal received in the receiving part, signal to interference ratio, bit error rate, and frame error rate.

4. The method as claimed in claim 1, further comprising the steps of:

the transmitting part compensating for the receiving quality in a manner that the transmitting part assigns more power to the signal if the data frame received in the receiving part is error; and the transmitting part re-transmitting the data whose receiving quality is compensated for to the receiving part.

5. The method as claimed in claim 1, further comprising the steps of:

the transmitting part processing the signal in accordance with the determined data transmission rate if the data frame received in the receiving part is error; and the transmitting part re-transmitting the processed signal to the receiving part.

6. The method as claimed in claim 1, wherein the determined data transmission rate is obtained by either one of a fixed type algorithm and a variable type algorithm with the measured receiving quality.

7. The method as claimed in claim 1, wherein adjusting to the new value includes lowering a value associated with the mapping table if the receiving part determines that the error occurs.

8. The method as claimed in claim 7, further comprising determining the data transmission rate based on the adjusted new value.

9. The method as claimed in claim 1, wherein adjusting to the new value includes raising to a new value associated with the mapping table if the receiving part determines that no error occurs.

10. The method as claimed in claim 9, further comprising determining the data transmission rate based on the adjusted new value.

11. A method of transmitting data in a communication system comprising the steps of:

a fixed type algorithm preparing a mapping table having a fixed range of receiving quality with respect to a data transmission rate of a received signal;

a receiving part measuring the receiving quality of the received signal, and determining the data transmission rate in accordance with the measured receiving quality using the mapping table, wherein determining the data transmission rate includes adjusting SIR on the mapping table based on whether an error occurs;

the receiving part transmitting the determined data transmission rate to a transmitting part; and the transmitting part encoding data to be transmitted in accordance with the determined data transmission rate, and transmitting the encoded data to the receiving part.

12. The method as claimed in claim 11, wherein the step of determining the data transmission rate comprises the steps of:

lowering SIR step by one step on the mapping table if the error occurs in the data received in the receiving part; and determining the data transmission rate corresponding to the lowered receiving quality on the mapping table as the data transmission rate corresponding to the received signal.

13. The method as claimed in claim 12, wherein the error is checked by a cyclic redundancy check code.

14. The method as claimed in claim 11, wherein the step of determining the data transmission rate comprises the steps of:

heightening SIR step by one step on the mapping table if the error occurs in the data received in the receiving part; and determining the data transmission rate corresponding to the heightened receiving quality on the mapping table as the data transmission rate corresponding to the received signal.

15. The method as claimed in claim 14, wherein the error is checked by a cyclic redundancy check code in the received signal.

16. The method as claimed in claim 11, wherein the receiving quality is measured using one among a pilot signal power level included in the signal received in the receiving part, signal to interference rate, bit error rate, and frame error rate.

17. The method as claimed in claim 11, wherein the data to be transmitted from the transmitting part is processed by a coding rate and modulation type that correspond to the determined data transmission rate.

18. A method of transmitting data in a communication system comprising the steps of:

a fixed type algorithm preparing a mapping table having a fixed range of receiving quality with respect to a data transmission rate of a received signal;

a receiving part checking whether an error exists in the received signal, and changing the mapping table using a variable type algorithm depending on a result of checking;

the receiving part determining the data transmission rate corresponding to a newly measured receiving quality using the changed mapping table;

the receiving part transmitting the determined data transmission rate to a transmitting part; and the transmitting part encoding data to be transmitted in accordance with the determined data transmission rate, and transmitting the encoded data to the receiving part.

19. The method as claimed in claim 18, wherein the step of changing the mapping table includes the step of heightening the receiving quality range mapped on the data transmission rate on the mapping table by "Γ" (heightened value of the receiving quality range)" if an error is occurred in the received signal.

20. The method as claimed in claim 18, wherein the step of changing the mapping table includes the step of lowering the receiving quality range mapped on the data transmission rate on the mapping table by "Δ" (lowered value of the receiving quality range)" if an error is not occurred in the received signal.

21. The method as claimed in claim 18, wherein the receiving quality is measured using one among a pilot signal power level included in the signal received in the receiving part, signal to interference ratio, bit error rate, and frame error rate.

22. The method as claimed in claim 18, wherein the error is checked by a cyclic redundancy check code in the received signal.

23. The method as claimed in claim 18, wherein the data to be transmitted from the transmitting part is processed by a coding rate and modulation type that correspond to the determined data transmission rate.

24. The method as claimed in claim 18, wherein changing the mapping table using the variable type algorithm comprises adjusting the received quality range mapped onto the data transmission rate on the mapping table based on whether an error occurred in the received signal.

25. A method of transmitting data in a communication system comprising the steps of:
   a fixed type algorithm preparing in a transmitting part a mapping table having a fixed range of receiving quality according to a data transmission rate;
   a receiving part measuring the receiving quality of a received pilot signal, and transmitting information corresponding to the measured receiving quality to the transmitting part;
   the transmitting part determining the data transmission rate using the information corresponding to the measured receiving quality and the mapping table;
   the transmitting part encoding data to be transmitted in accordance with the determined data transmission rate, and transmitting the encoded data to the receiving part; and
   adjusting a range of the received quality on the mapping table according to an existence/nonexistence of an error.

26. A method of transmitting data in a communication system comprising the steps of:
   preparing a mapping table having a range of receiving quality with respect to a data transmission rate;
   receiving data and checking whether an error exists in the received data using a cyclic redundancy check code;
   adjusting the range of the receiving quality on the mapping table according to existence/nonexistence of the error; and
   determining the data transmission rate using the mapping table where the range of the receiving quality is adjusted.

27. The method as claimed in claim 26, further comprising the steps of:
   measuring a new receiving quality after the mapping table where the range of the receiving quality is adjusted is made;
   comparing the mapping table where the range of the receiving quality is adjusted with the new receiving quality; and
   selecting a new data transmission rate that corresponds to the new receiving quality as a result of comparison.

28. The method as claimed in claim 26, wherein the receiving quality is a signal to interference rate (SIR).

29. A communication system comprising:
   means for preparing a mapping table having a fixed range of receiving quality with respect to a data transmission rate of a received signal by a fixed algorithm;
   means for measuring the receiving quality of the received signal, and determining the data transmission rate in accordance with the measured receiving quality using the mapping table, wherein determining the data transmission rate includes adjusting SIR on the mapping table based on whether an error occurs; and
   means for transmitting the determined data transmission rate to a transmitting part.

30. A communication system comprising:
   means for preparing a mapping table having a fixed range of receiving quality with respect to a data transmission rate of a received signal by a fixed type algorithm;
   means for checking whether an error exists in the received signal, and changing the mapping table using a variable type algorithm depending on a result of checking;
   means for measuring receiving quality of a newly received signal having a certain data transmission rate;
   means for determining the data transmission rate corresponding to a newly measured receiving quality using the changed mapping table; and
   means for transmitting the determined data transmission rate to a transmitting part.

* * * * *